US011124458B2

(12) United States Patent
Fulton et al.

(10) Patent No.: US 11,124,458 B2
(45) Date of Patent: Sep. 21, 2021

(54) NANOCARBON PARTICLE ADMIXTURES FOR CONCRETE

(71) Applicant: EDEN INNOVATIONS LTD., Perth (AU)

(72) Inventors: Justin Fulton, Fort Collins, CO (US); Gregory H. Solomon, Cottlesloe (AU); Roger W. Marmaro, Highlands Ranch, CO (US); Robert Cavaliero, Littleton, CO (US); Allan Godsk Larsen, Dalvej (DK); Shawn Meredith, Denver, CO (US); Christopher Flatley Abatelli, Lakewood, CO (US)

(73) Assignee: EDEN INNOVATIONS LTD., Perth (AU)

( * ) Notice: Subject to any disclaimer, the term of this patent is extended or adjusted under 35 U.S.C. 154(b) by 116 days.

(21) Appl. No.: 16/722,288

(22) Filed: Dec. 20, 2019

(65) Prior Publication Data
US 2020/0140342 A1    May 7, 2020

Related U.S. Application Data

(62) Division of application No. 15/597,198, filed on May 17, 2017, now Pat. No. 10,584,072.

(51) Int. Cl.
*C04B 40/00* (2006.01)
*C04B 28/02* (2006.01)

(52) U.S. Cl.
CPC .......... *C04B 40/0046* (2013.01); *C04B 28/02* (2013.01)

(58) Field of Classification Search
CPC ........................ C04B 28/02; C04B 40/0046
See application file for complete search history.

(56) References Cited

U.S. PATENT DOCUMENTS

| 4,964,917 | A | 10/1990 | Bobrowski et al. | |
|---|---|---|---|---|
| 6,358,310 | B1 ‡ | 3/2002 | Berke | C04B 24/32 106/72 |
| 6,387,173 | B2 ‡ | 5/2002 | Greenwood | C04B 28/02 106/72 |

(Continued)

FOREIGN PATENT DOCUMENTS

| CN | 105 268 339 | 1/2016 |
|---|---|---|
| WO | 2002/12080 A1 ‡ | 2/2002 |

(Continued)

OTHER PUBLICATIONS

"Investor Presentation: Carbon Nanotube Project" by Greg Solomon, Chairman of Eden Energy Ltd. (Jul. 27, 2015) (Year: 2015).*

(Continued)

*Primary Examiner* — Pegah Parvini
*Assistant Examiner* — Ross J Christie
(74) *Attorney, Agent, or Firm* — Stephen A. Gratton

(57) ABSTRACT

An admixture for concrete includes at least two different types of nanocarbon particles in a water/surfactant mixture having a predetermined percentage range by mass of the admixture. The admixture also includes surfactant and can include a nano-silica based suspension stabilizer having a predetermined percentage range by mass of the admixture.

12 Claims, 16 Drawing Sheets

(56) References Cited

U.S. PATENT DOCUMENTS

| | | | |
|---|---|---|---|
| 6,875,417 B1 ‡ | 4/2005 | Shah | B01J 23/755 423/44 |
| 7,666,327 B1 ‡ | 2/2010 | Veedu | C04B 28/02 106/71 |
| 7,744,690 B2 ‡ | 6/2010 | Durst | C04B 28/02 106/64 |
| 7,985,354 B1 | 7/2011 | Veedu | |
| 8,016,938 B2 ‡ | 9/2011 | Durst | C04B 28/02 106/64 |
| 8,092,778 B2 ‡ | 1/2012 | Zhu | B82Y 30/00 423/44 |
| 8,551,243 B2 ‡ | 10/2013 | Soto Montoya | C04B 40/0039 106/71 |
| 8,759,423 B2 ‡ | 6/2014 | Chen | C04B 16/04 524/5 |
| 9,365,456 B2 ‡ | 6/2016 | Shah | C04B 28/02 |
| 9,499,439 B2 ‡ | 11/2016 | Shah | C04B 28/02 |
| 9,546,091 B2 ‡ | 1/2017 | Yang | B82Y 30/00 |
| 10,584,072 B2 | 3/2020 | Fulton | |
| 2002/0127351 A1 ‡ | 9/2002 | Takikawa | B01J 19/088 427/569 |
| 2003/0129122 A1 | 7/2003 | Chen et al. | |
| 2003/0148097 A1 ‡ | 8/2003 | Takikawa | B82Y 30/00 428/364 |
| 2008/0279753 A1 ‡ | 11/2008 | Harutyunyan | B82Y 30/00 423/447.2 |
| 2011/0067864 A1* | 3/2011 | Reddy | C09K 8/467 166/285 |
| 2011/0210282 A1* | 9/2011 | Foley | B82Y 25/00 252/62.51 R |
| 2012/0042806 A1 ‡ | 2/2012 | Hersam | C04B 14/024 106/814 |
| 2013/0104775 A1 | 5/2013 | Binhussain et al. | |
| 2014/0080942 A1 ‡ | 3/2014 | Brien | C04B 28/02 524/2 |
| 2015/0203661 A1* | 7/2015 | Ismail | C08K 5/09 524/575.5 |
| 2017/0018324 A1 ‡ | 1/2017 | Tokutomi et al. | |
| 2017/0210282 A1 | 7/2017 | Rodriguez Barros | |
| 2018/0334407 A1 | 11/2018 | Fulton et al. | |

FOREIGN PATENT DOCUMENTS

| | | |
|---|---|---|
| WO | WO 2002/12080 A1 | 2/2002 |
| WO | WO 2009/042452 A1 | 4/2009 |
| WO | WO 2018/103814 A1 | 6/2018 |

OTHER PUBLICATIONS

Eden: US Investor Presentation by Greg Solomon, Chairman of Eden Energy Ltd. (May 2017) (Year: 2017).*

Madhanasree R.M. et al., "Study on Silica Fume Replaced Concrete With Super Plasticizer", ARPN Journal of Engineering and Applied Sciences, vol. 11, No. 9, May 2016, pp. 5971-5974.‡

International Search Report in application No. PCT/US18/28054 filed Apr. 18, 2018 entitled Methods and Systems for Making Nanocarbon Particle Admixtures and Concrete, dated Jun. 20, 2019, pp. 1-4.

International Written Opinion in application No. PCT/US18/28054 filed Apr. 18, 2018 entitled Methods and Systems for Making Nanocarbon Particle Admixtures and Concrete, dated Jun. 20, 2019, pp. 1-13.

Solomon, G., "Investor Presentation: Carbon Nanotube Project. Eden Energy Ltd.", Perth, Western Australia; Jul. 27, 2015, pp. 1-21.

Zhao, Z. et al., "Research Article: Processing and Structure of Carbon Nanofiber Paper", Journal of Nanomaterials. Feb. 24, 2009, vol. 2009, Article ID 325769, Hindawi Publishing Corporation, pp. 1-7.

Solomon, G., "Eden: US Investor Presentation: Eden Innovations", Perth, Western Australia, May 2017, pp. 1-34.

Jang, H. et al., Emission Characteristic of Ammonia in Cement Mortars Using Different Sand from Area of Production, Environ, Eng. Res. Apr. 8, 2016, pp. 1-21.

Teng, T. P. et al., Fabrication and Characterization of Nanocarbon-Based Nanofluids by Using an Oxygen-Acetylene Flame Synthesis System, Nanoscale Research Letters, 2016, vol. 11, No. 288, pp. 1-13.

Moore, Valerie C. et al., Individually Suspended Single-Walled Carbon Nanotubes in Various Surfactants, Nano Letters, Sep. 9, 2002, vol. 3, No. 10, pp. 1-4.

U.S. Appl. No. 15/597,198, filed May 17, 2017, Notice of Allowance, dated Dec. 9, 2019, pp. 1-9.

U.S. Appl. No. 15/597,198, filed May 17, 2017, Final Office Action, dated Oct. 25, 2019, pp. 1-33.

U.S. Appl. No. 15/597,198, filed May 17, 2017, Non Final Office Action, dated Apr. 24, 2019, pp. 1-22.

European Patent Application 18801609.1, Extended European Search Report, dated Feb. 23, 2021, pp. 1-19.

International Application No. PCT/US20/47092, Search Report and the Written Opinion of the International Searching Authority, dated Nov. 18, 2020, pp. 1-8.x.

* cited by examiner
‡ imported from a related application

NANOCARBON PARTICLE ADMIXTURES FOR CONCRETE

CROSS-REFERENCE TO RELATED APPLICATIONS

This application is a division of Ser. No. 15/597,198 filed May 17, 2017.

FIELD

This disclosure relates to methods and systems for making admixtures for concrete that contain nanocarbon particles. This disclosure also relates to methods and systems for making concrete using the admixtures.

BACKGROUND

Carbon nanotubes (CNTs) are being used to enhance properties, including strength, in a variety of materials. For example, Portland cement can include dispersed carbon nanotubes (CNTs) for making high-performance concrete and other cement-based materials. Calcium silicate hydrate (CSH) is the main product of the hydration of Portland cement and is primarily responsible for the strength in concrete. In the cured concrete, the ultra-strong carbon nanotubes (CNTs) form nanostructures that function as nanoscopic reinforcement to strengthen the concrete. CNTs and other nanometer scale carbon particles can provide a very high number of finely-dispersed nucleation sites for CSH formation, which densifies the cured cement matrix in concrete composite materials, further strengthening the material and improving other desirable characteristics, such as lower permeation, higher abrasion resistance, and better bonding between the cement and other aggregate materials in the concrete mix. The carbon nanotubes (CNTs) or other nanocarbon particles can originally be included in an admixture, which is added to the cement. In general, admixtures are the ingredients for the concrete other than the typical cement (and supplementary cementing materials), water, and aggregate (sand and stones). Admixtures are usually liquid additives that are added before or during concrete mixing.

One problem with using carbon nanotubes (CNTs) in admixtures for concrete is that they historically have been expensive to produce. On the other hand, concrete is a bulk material that has to be produced with a low cost. It would be commercially advantageous to have the capability to manufacture admixtures for concrete that contain carbon nanotubes (CNTs), as well as other nanocarbon materials, in a cost effective and efficient manner.

Another problem with using carbon nanotubes (CNTs) in concrete is that they are difficult to effectively incorporate into the cement within the concrete. U.S. Pat. Nos. 9,365,456 and 9,499,439 to Shah et al. disclose a method for making cement compositions that incorporate carbon nanotubes (CNTs) by ultra-sonicating a mixture of a superplasticizer, water and carbon nanotubes (CNTs), to be subsequently mixed with cement. Although effective in a laboratory setting, this method is not generally cost effective for the large-scale production of concrete admixtures. In addition, this method requires additional equipment and processes for ultra-sonicating the mixture of water, superplasticizer, and carbon nanotubes (CNTs) in a relatively short time frame prior to mixing with cement, due to a short time in which the CNT suspension remains stable.

The present disclosure is directed to a method and system for making nanocarbon particle admixtures and concrete that overcomes some of the problems of the related art. The present disclosure is also directed to an improved admixture for concrete that contains de-agglomerated nanocarbon particles as well as a superplasticizer in a well-dispersed suspension that is stable for long-distance distribution and long-term storage. The present disclosure is also directed to improved concrete products made using the methods and admixtures.

However, the foregoing examples of the related art and limitations related therewith are intended to be illustrative and not exclusive. Other limitations of the related art will become apparent to those of skill in the art upon a reading of the specification and a study of the drawings.

SUMMARY

An admixture in liquid form for making concrete includes a suspension of uniformly dispersed nanocarbon particles in a water/surfactant mixture. The nanocarbon particles include at least two different types of particles selected from the group consisting of carbon nanotube particles, carbon nanofiber particles, graphene particles, graphite particles, carbon black and "amorphous" paracrystalline or polycrystalline carbon particles, nanodiamonds, and single-layer or multi-layer fullerene particles. Each type of nanocarbon particle has a predetermined percentage range by mass of the admixture. The admixture also includes a superplasticizer surfactant also having a predetermined percentage range by mass of the admixture, which is configured to facilitate the dispersion of the nanocarbon particles in the admixture. The admixture can also include a nano-silica-based suspension stabilizer, also having a predetermined percentage range by mass of the admixture, which is configured to improve the long term stability of the suspension of nanocarbon particles in the admixture.

A method for making the admixture includes the initial step of providing a nanocarbon mixture that includes at least two different types of nanocarbon particles, selected from the group consisting of carbon nanotube particles, carbon nanofiber particles, graphene particles, graphite particles, carbon black, "amorphous" paracrystalline or polycrystalline carbon particles, nanodiamonds, and single-layer or multi-layer fullerene particles, with each type of nanocarbon particle having a predetermined percentage range by mass of the admixture.

In an illustrative embodiment, the nanocarbon mixture can be produced using a heated reactor and catalytic decomposition of a hydrocarbon feed gas. For performing the production process, a catalyst and reaction conditions in the reactor are selected to provide different types of nanocarbon particles in selected mass percentage ranges. For example, the reaction conditions and the catalyst can be selected and controlled such that the nanocarbon mixture includes at least two different types of nanocarbon particles as described above.

Rather than being produced in a heated reactor, the nanocarbon mixture can be provided as a desired composition of nanocarbon particles. For example, certain nanocarbon materials are mass produced and commercially available in industrial commodity markets from a producer. With either production or commercial purchase of the nanocarbon mixture, different types of nanocarbon particles produced from different processes can be blended or mixed together to provide a particular nanocarbon mixture having desired characteristics, such as desired mass percentage ranges of the different nanocarbon particles.

The step providing the nanocarbon mixture can also include the step of crushing or grinding the nanocarbon mixture into a powder configured for uniform dispersion in water. This process can be performed using a suitable mechanical crushing or grinding apparatus.

Following any crushing or grinding of the nanocarbon mixture, the method can include the steps of storing, conveying, and transporting the nanocarbon mixture in the carbon powder form. For example, the nanocarbon mixture can be stored in a relatively large vessel, such as a silo or tank, having an inlet/outlet in flow communication with a conveyor configured to transport the nanocarbon mixture to a desired location.

The method also includes the steps of wetting and mixing predetermined quantity of the nanocarbon mixture in carbon powder form in a predetermined quantity of water/surfactant mixture with intense, high energy, large scale mixing equipment. During the wetting and mixing step, the nanocarbon particles, and other nano-particles as well, are de-agglomerated and uniformly dispersed in the liquid admixture. The water/surfactant mixture can include a predetermined quantity of a superplasticizer surfactant.

The method can also include the step of blending the nanocarbon mixture with a nano-silica based compound for long-term stability of the suspended nanocarbon particles in the liquid admixture, either before or after the wetting and mixing step. If performed before the wetting and mixing step, this step can be used to uniformly disperse and de-agglomerate the nano-silica based particles into the nanocarbon mixture.

The method can also include the step of blending the nanocarbon mixture with an organic compound including a functional group that contains a basic nitrogen atom with a lone pair to increase early and/or late strength development in the concrete. Dosage is typically in the range of 0.5 to 20% by mass of the admixture. A low dosage will typically improve early strength and a high dose will typically improve late strength of the concrete.

The method can also include the step of storing the liquid admixture for specific quality control testing. The storing step can also include the step of longer-term warehousing and storage with controlled environmental conditions and equipment for scheduled recirculation of the admixture and quality control checks. The method can also include the step of packaging the liquid admixture in a container for single-use or bulk sales and distribution.

A method for making concrete includes the steps of: providing an admixture that includes a nanocarbon mixture comprised of nanocarbon particles that include at least two different types of particles, a superplasticizer surfactant, and a stabilizer comprised of a nano-silica based compound; and mixing the admixture with water, cement (with or without supplementary cementitious materials), and mineral aggregates in selected quantities.

A concrete in uncured form includes primarily cementitious materials, aggregate, water, and an admixture comprising a nanocarbon mixture that include at least two different types of particles selected from the group consisting of carbon nanotube particles, carbon nanofiber particles, graphene particles, graphite particles, carbon black and "amorphous" paracrystalline or polycrystalline carbon particles, nanodiamonds, and single-layer or multi-layer fullerene particles. The admixture can also include a superplasticizer surfactant configured to maintain carbon dispersion, and it can include a suspension stabilizer comprised of a nano-silica based compound.

BRIEF DESCRIPTION OF THE DRAWINGS

Exemplary embodiments are illustrated in the referenced figures of the drawings. It is intended that the embodiments and the figures disclosed herein be considered illustrative rather than limiting.

DETAILED DESCRIPTION

Figure 1:
FIG. 1 is a photo of a CNT nanocarbon mixture containing carbon nanotubes (CNTs) prior to crushing or grinding.

As used herein, the term "concrete" means a material in either a cured or an uncured state that includes cement (with or without supplementary cementing materials, such as blast furnace slag, fly ash, limestone fines, and silica fume), mineral aggregate sand and stones, and water. The term "cement" means hydratable cement such as Portland cement produced from clinker containing hydraulic calcium silicates. The term "supplementary cementing" or "cementitious" means materials that form a plastic paste when mixed with a liquid, which harden and function as a glue or binder for holding the composite concrete material together. Cementitious materials form a hard matrix to bind aggregates and contribute to the properties of hardened concrete through hydraulic or pozzolanic activity. While Portland cement is a common concrete matrix material, alternative examples include, but not limited to, various limes and mortars, fly ashes, ground blast-furnace slag, and silica fume. The term "admixture" means ingredients added to concrete before or during mixing. The term "superplasticizer" means a surfactant used to uniformly disperse particles in uncured concrete.

As used herein, the term "nanocarbon particle" means a particle comprising an allotrope of carbon with one or more particle dimensions on the order of 500 nanometers (nm) or less. "Nanotubes" mean cylindrical nanostructures comprising one or more cylindrical tubes of atoms having a high length to diameter ratio. Nanotubes can be categorized as single-walled nanotubes (SWNTs) or multi-walled nanotubes (MWNTs). "Nanotube particles" comprise individual molecules, particles, or agglomerates of particles comprised of nanotubes. "Nanofibers" means cylindrical nanostructures with a high length to diameter ratio, with atomic layers in a stacked plate, cup, or cone configuration. "Nanofiber particles" comprise individual molecules, particles, or agglomerates of particles comprised of nanofibers. "Graphene" means small particles of a two-dimensional hexagonal lattice of carbon atoms. Graphene is the basic structure of many other allotropes of carbon, including carbon nanotubes, carbon nanofibers, graphite, and other fullerenes. "Graphite" means a carbon crystalline atomic structure comprised of layers of graphene. "Carbon black" means a fine powder comprised of nanometer scale particles and agglomerates with an "amorphous" paracrystalline or polycrystalline atomic structure, usually made from decomposition and incomplete combustion of hydrocarbon feedstocks, but for the purposes of this disclosure, "carbon black" also includes finely-ground charcoal, coal, or activated carbon materials. "Nanodiamonds" means nanometer scale particles of a carbon allotrope with diamond crystal atomic structure. "Fullerene" means molecules or particles comprised of graphitic crystalline structures with defects in the hexagonal atomic lattice that bend or curve the layer(s) into spheres ("onions"), buds, cones, horns, tubes, or other composite shapes built from sub-structures with these simpler forms. "Nano-silica" means silica material with one or more particle dimensions on the order of 500 nanometers (nm) or less.

Nanocarbon Mixture

Referring to FIG. 1, a nanocarbon mixture containing a selected percentage range of CNTs is shown in raw, bulk form following production using a heated reactor and catalytic decomposition of a hydrocarbon feed gas. The nanocarbon mixture comprises CNTs containing defects as well as other amorphous forms of nanocarbon as well as catalyst particles. Typically, the CNTs comprise multi walled CNTs (MWCNTs) but can also include single walled CNTs (SWCNTs). In addition, the CNTs can occur in bundles of CNTs entrained in amorphous carbon structures. The nanocarbon mixture has the texture of powder but includes large clumps and agglomerates of carbon material such as bundles containing CNTs and amorphous carbon.

Figure 2:
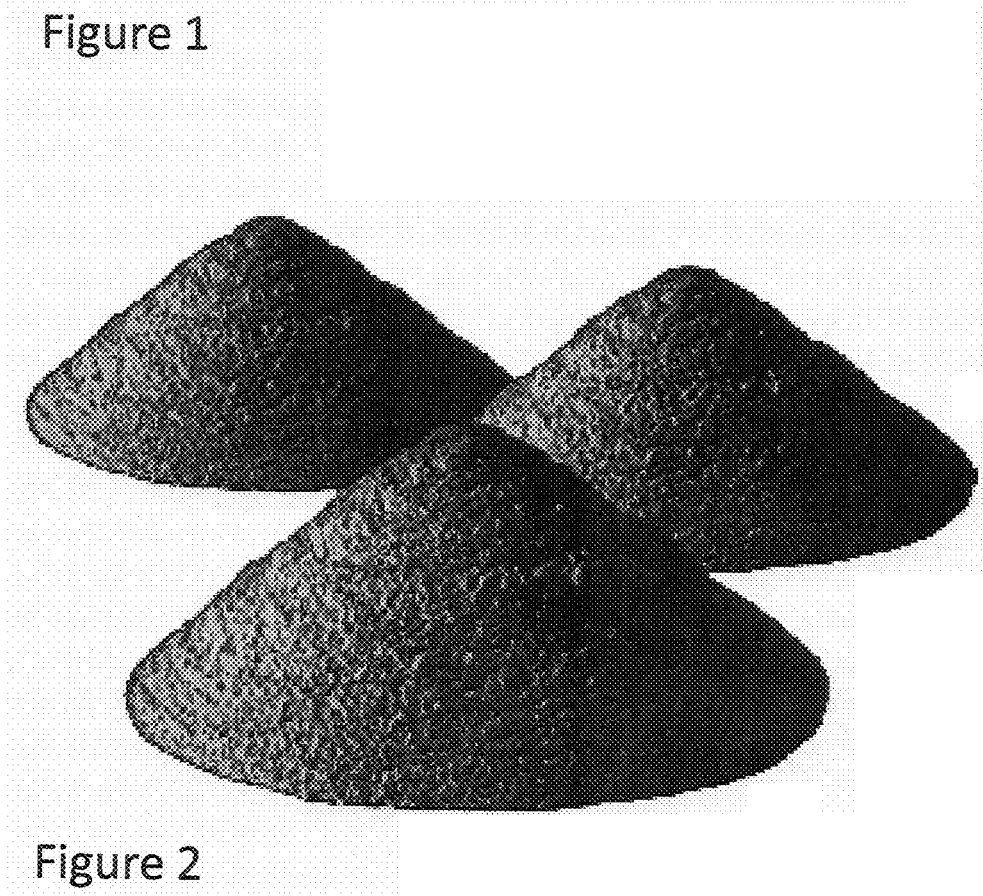
FIG. 2 is a photo of the CNT nanocarbon mixture following crushing or grinding into a coarse powder.

Referring to FIG. 2, the nanocarbon mixture is shown following grinding into a carbon powder. As will be further described, the carbon powder facilitates dispersion of the nanocarbon mixture in a water/surfactant mixture.

Figure 3:
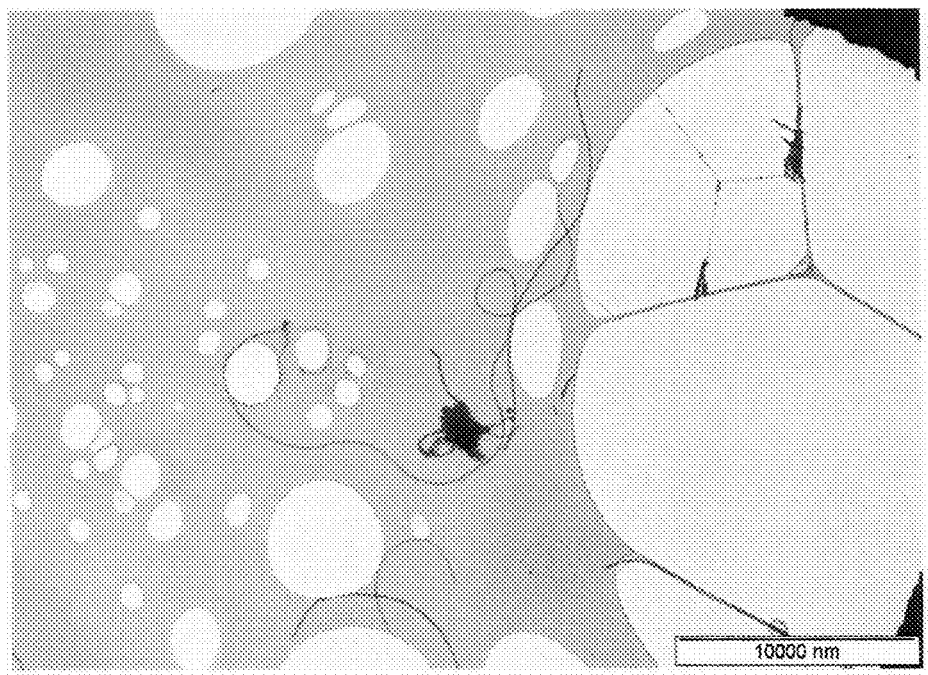
FIG. 3 is a TEM (transmission electron microscopy) photo, with a 10,000 nm scale shown in the lower right hand corner, of a CNT/amorphous carbon bundle and a few, long individual tubes in the CNT nanocarbon mixture, with the tube lengths varying from <200 nm to >20,000 nm.

Referring to FIG. 3, a CNT/amorphous carbon bundle and a few, long individual tubes in the nanocarbon mixture are shown, with diameters <100 nm and tube lengths varying from <200 nm to >20,000 nm.

Figure 4:
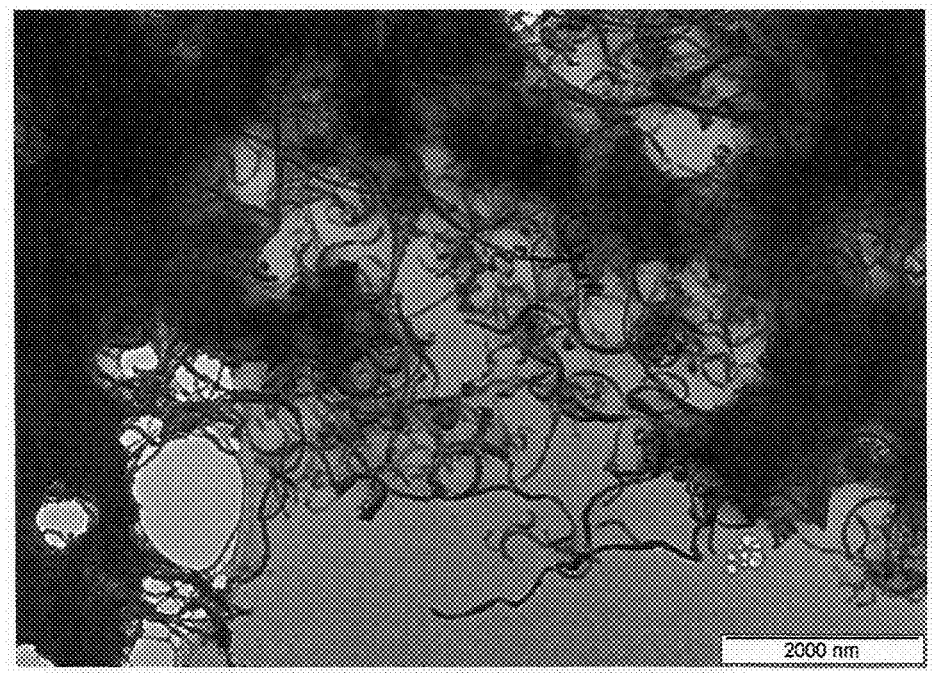
FIG. 4 is a TEM photo, with a 2000 nm scale shown in the lower right hand corner, of a CNT/nanocarbon bundle in the CNT nanocarbon mixture with the finely ground bundles typically ranging from 5 μm to 1500 μm.

Referring to FIG. 4, a CNT/nanocarbon bundle in the nanocarbon mixture is shown with the finely ground bundles typically ranging from 5 μm to 1500 μm.

Figure 5:
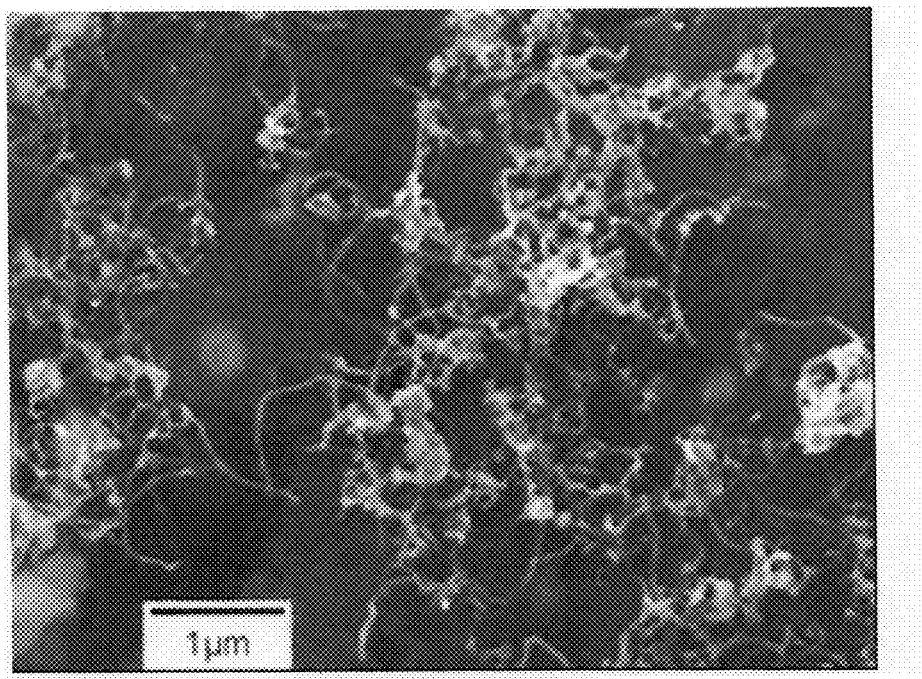
FIG. 5 is a SEM (scanning electron microscopy) photo, with a 1 μm scale shown in the lower left hand corner, which provides a closer view of the surfaces and 3D structures on a nanocarbon bundle in the CNT nanocarbon mixture.

Referring to FIG. 5, a closer view of the surfaces and 3D structures on a nanocarbon bundle in the nanocarbon mixture is shown.

Figure 6:
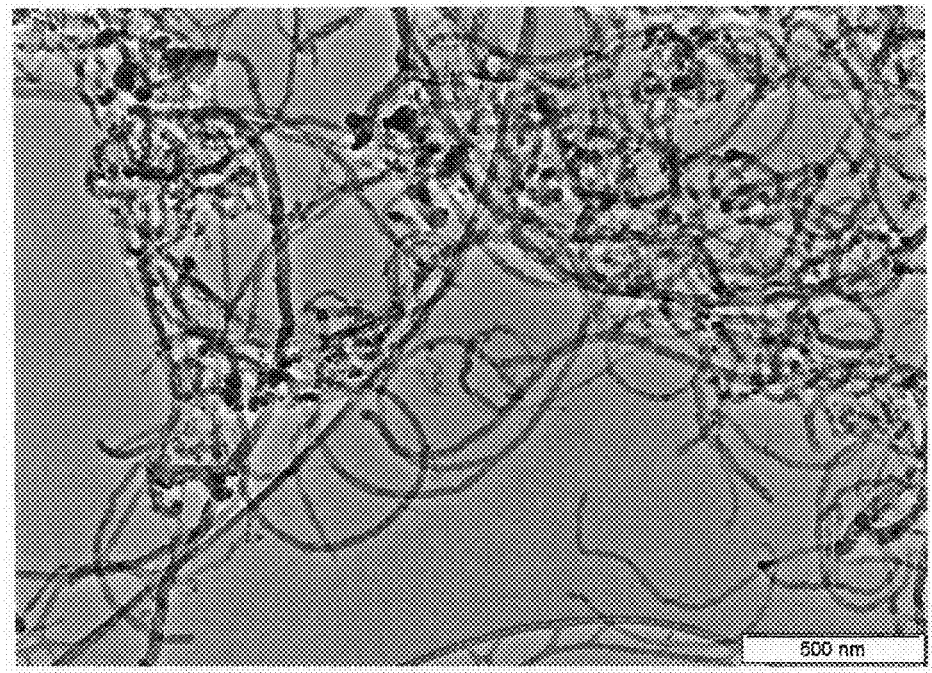
FIG. 6 is a TEM photo, with a 500 nm scale shown in the lower right hand corner, showing CNTs in the CNT nanocarbon mixture having hollow cores and many defects, such as bends, twists, and bamboo sections.

Referring to FIG. 6, CNTs in the nanocarbon mixture are shown having hollow cores and many defects, such as bends, twists, and bamboo sections.

Figure 7:
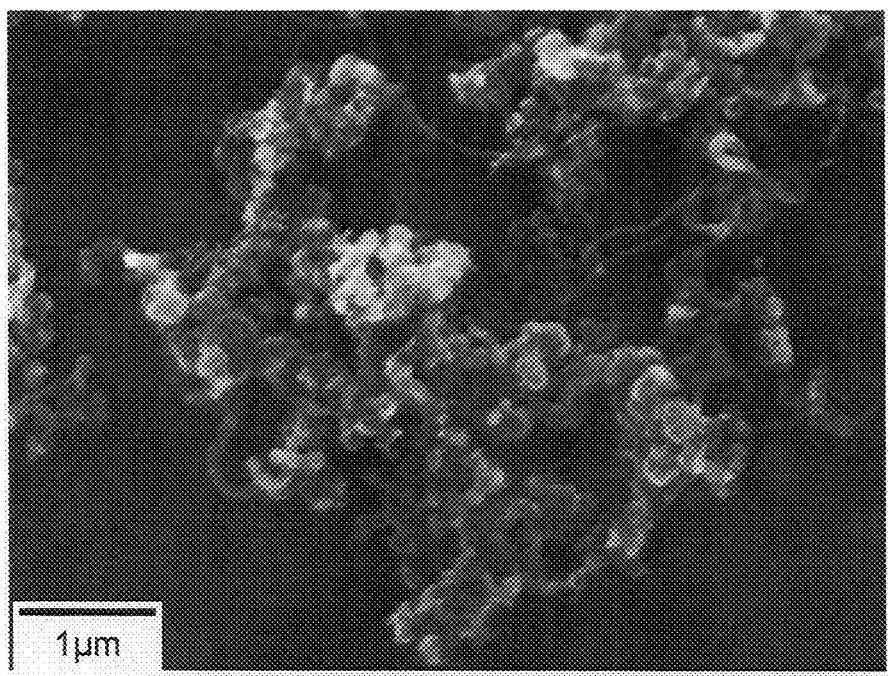
FIG. 7 is a SEM photo, with a 1 μm scale shown in the lower left hand corner, showing in addition to CNTs clusters of amorphous carbon included in the CNT nanocarbon mixture.

Referring to FIG. 7, clusters of amorphous carbon included in the nanocarbon mixture are shown.

Figure 8:
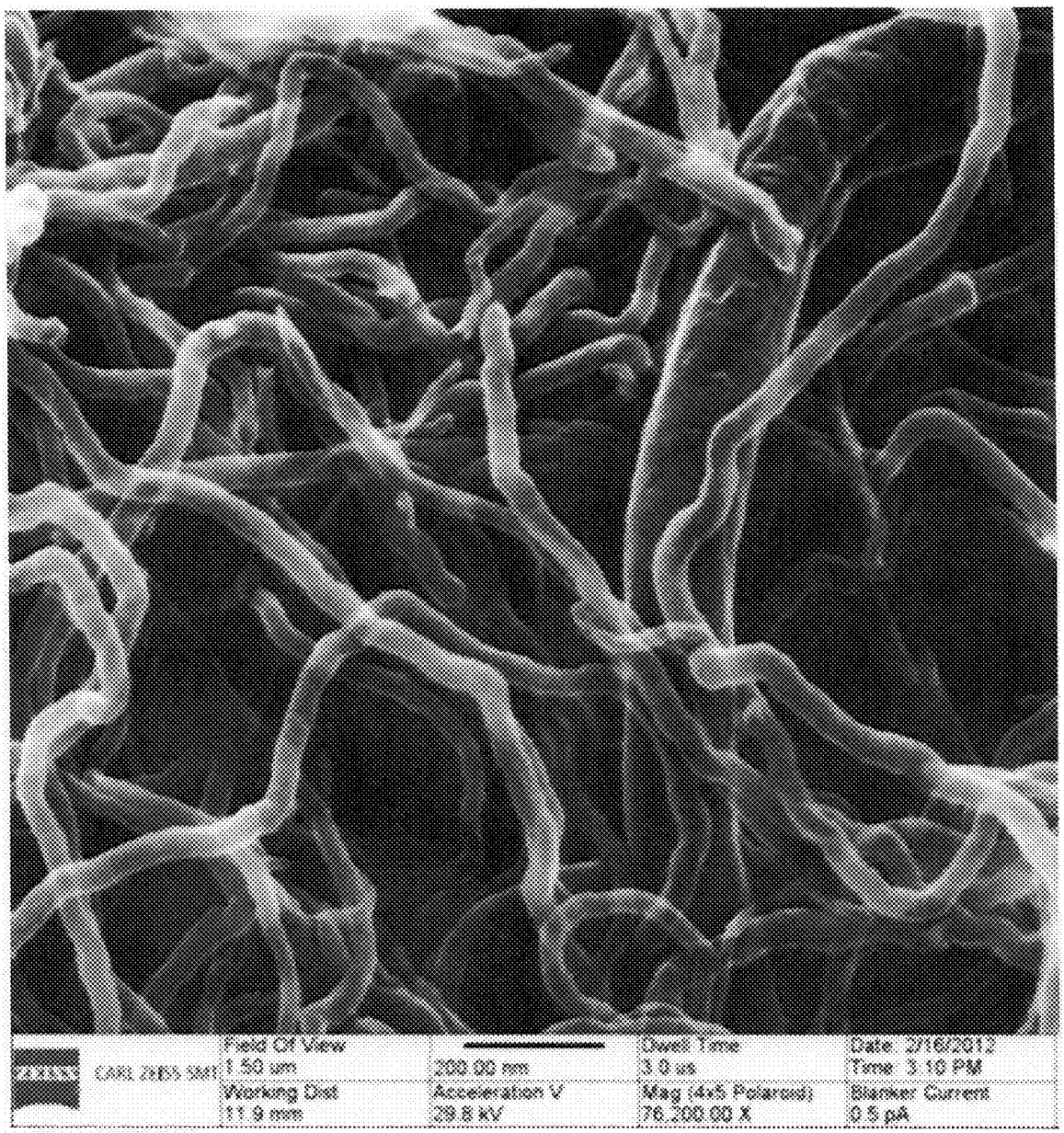
FIG. 8 is a SHIM (scanning helium ion microscopy) photo, with a 1.50 μm field of view, a working distance of 11.9 mm, a scale of 200 nm shown in the lower middle, an Acceleration V of 29.8 kV, a Dwell Time of 3.0 μs, a Magnification (4×5 Polaroid) of 76.200×, and a Blanker Current of 0.5 pA, showing surfaces of CNTs in the CNT nanocarbon mixture with much better focus and depth of field than SEM.

Referring to FIG. 8, surfaces of CNTs in the nanocarbon mixture are shown.

Figure 9:
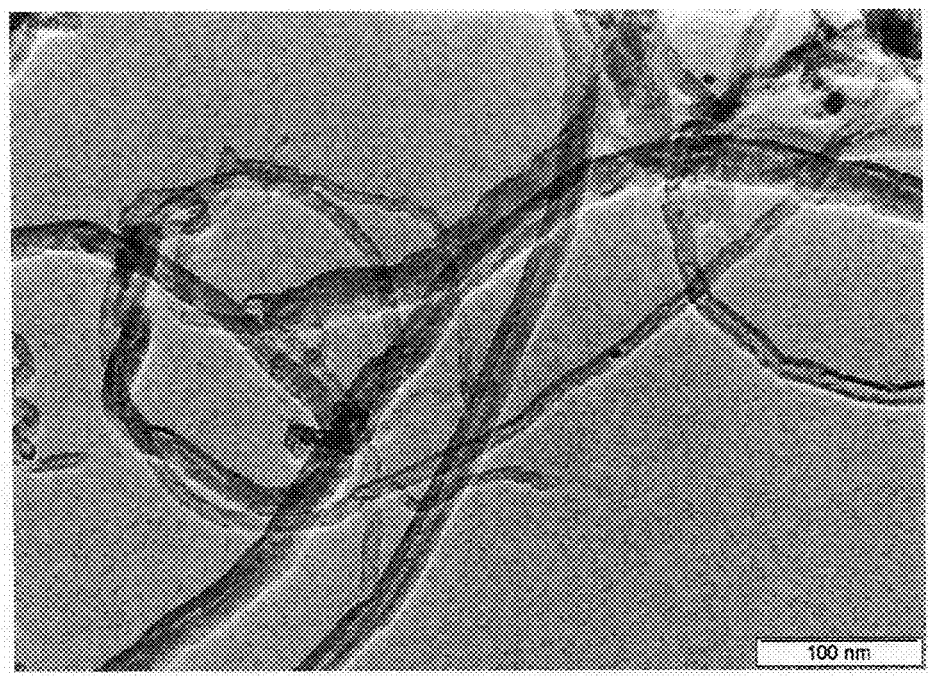
FIG. 9 is a TEM photo, with a 100 nm scale shown in the lower right hand corner, showing the hollow structure of CNTs in the CNT nanocarbon mixture at high magnification, with the dark spots comprising catalyst particles.

Referring to FIG. 9, the hollow structure of CNTs in the nanocarbon mixture are shown at high magnification with the dark spots comprising catalyst particles.

Figure 10:
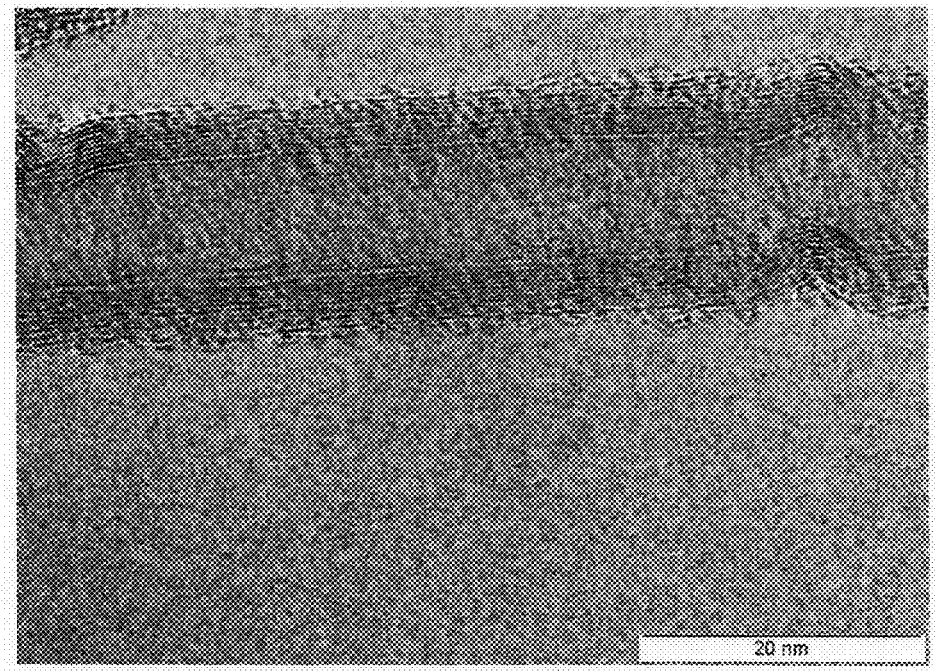
FIG. 10 is a TEM photo, with a 20 nm scale shown in the lower right hand corner, with the image grainy, but with individual tube walls (layers) in CNTs in the CNT nanocarbon mixture shown.

Referring to FIG. 10, individual tube walls (layers) in CNTs in the nanocarbon mixture are shown.

Figure 11:
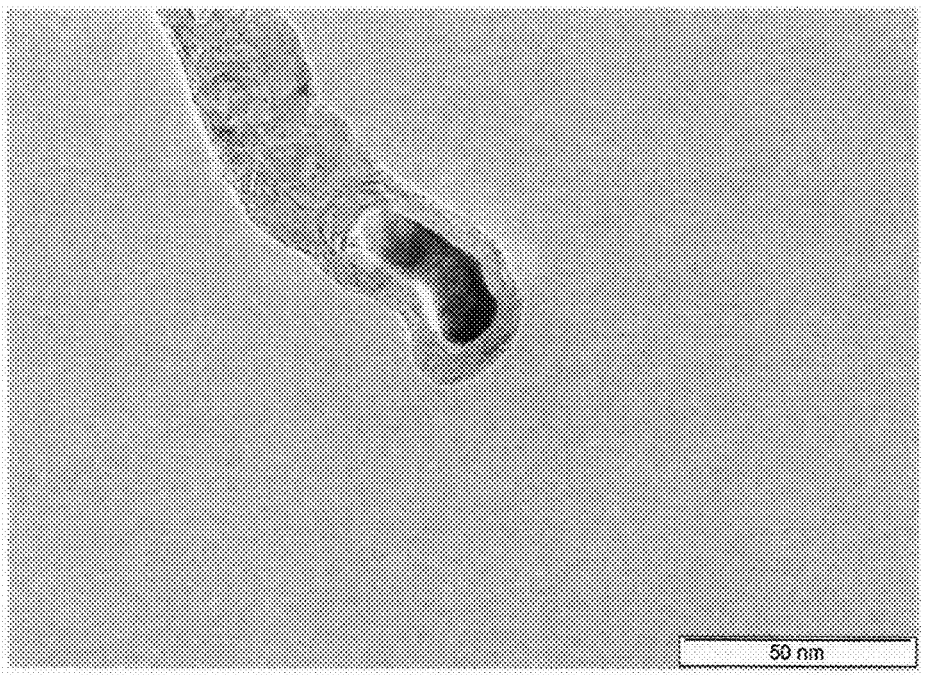
FIG. 11 is a TEM photo, with a 50 nm scale shown in the lower right hand corner, showing a darker, peanut shaped object, which is a catalyst particle encapsulated in carbon layers at the end of a CNT.

Referring to FIG. 11, a catalyst particle encapsulated in carbon layers at the end of a CNT in the nanocarbon mixture is shown.

Figure 12:
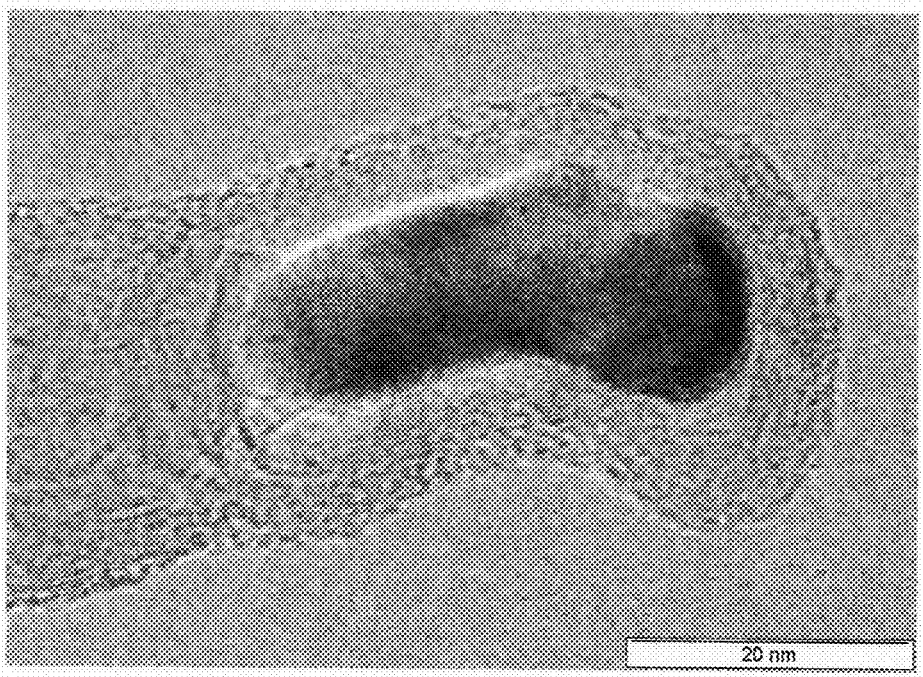
FIG. 12 is a TEM photo, with a 20 nm scale shown in the lower right hand corner, showing the same catalyst particle as shown in FIG. 11 but with individual graphitic carbon walls (layers) shown.

Referring to FIG. 12, the same catalyst particle as shown in FIG. 11 is shown but with individual graphitic carbon walls (layers) shown.

Figure 13:
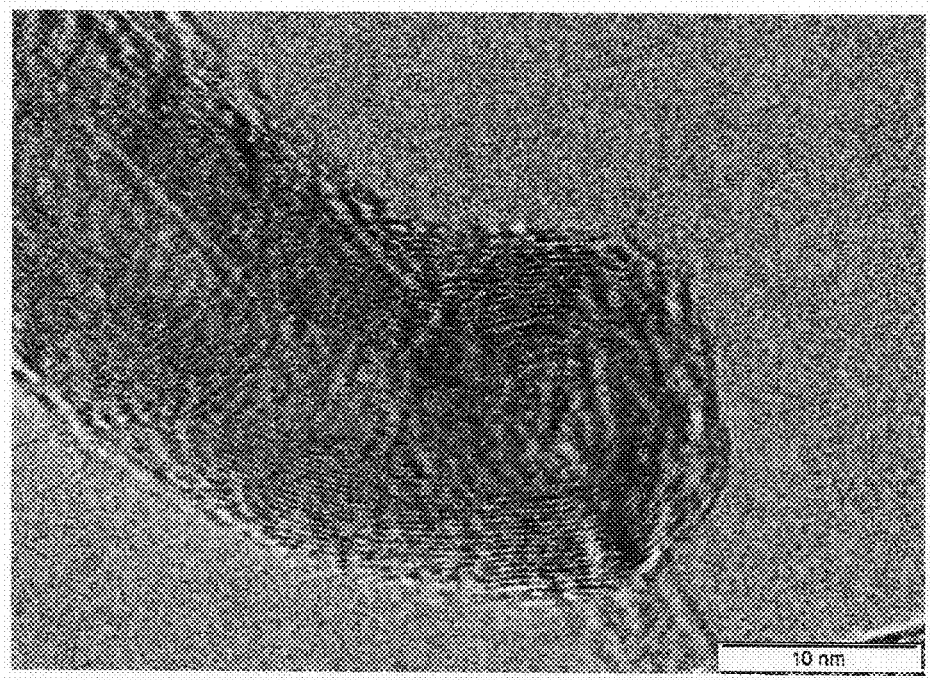
FIG. 13 is a TEM photo, with a 10 nm scale shown in the lower right hand corner, showing another CNT at the highest magnification, with the end of the CNT appearing to be closed but without a catalyst particle.

Referring to FIG. 13, another CNT in the nanocarbon mixture is shown, with the end of the CNT appearing to be closed but without a catalyst particle.

Figure 14:
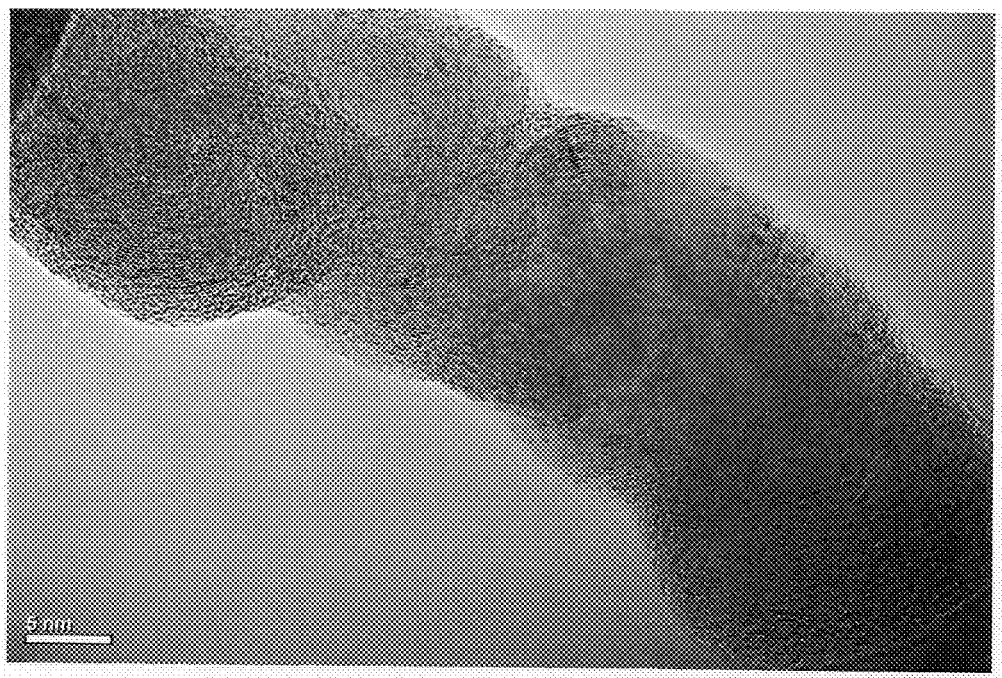
FIG. 14 is a TEM photo, with a 5 nm scale shown in the lower left hand corner, showing a nanocarbon particle in the CNT nanocarbon mixture with some graphitic internal structure, but not specifically a hollow CNT or strictly amorphous.

Referring to FIG. 14, a nanocarbon particle in the nanocarbon mixture is shown with some graphitic internal structure, but not specifically a hollow CNT or strictly amorphous.

Figure 15:
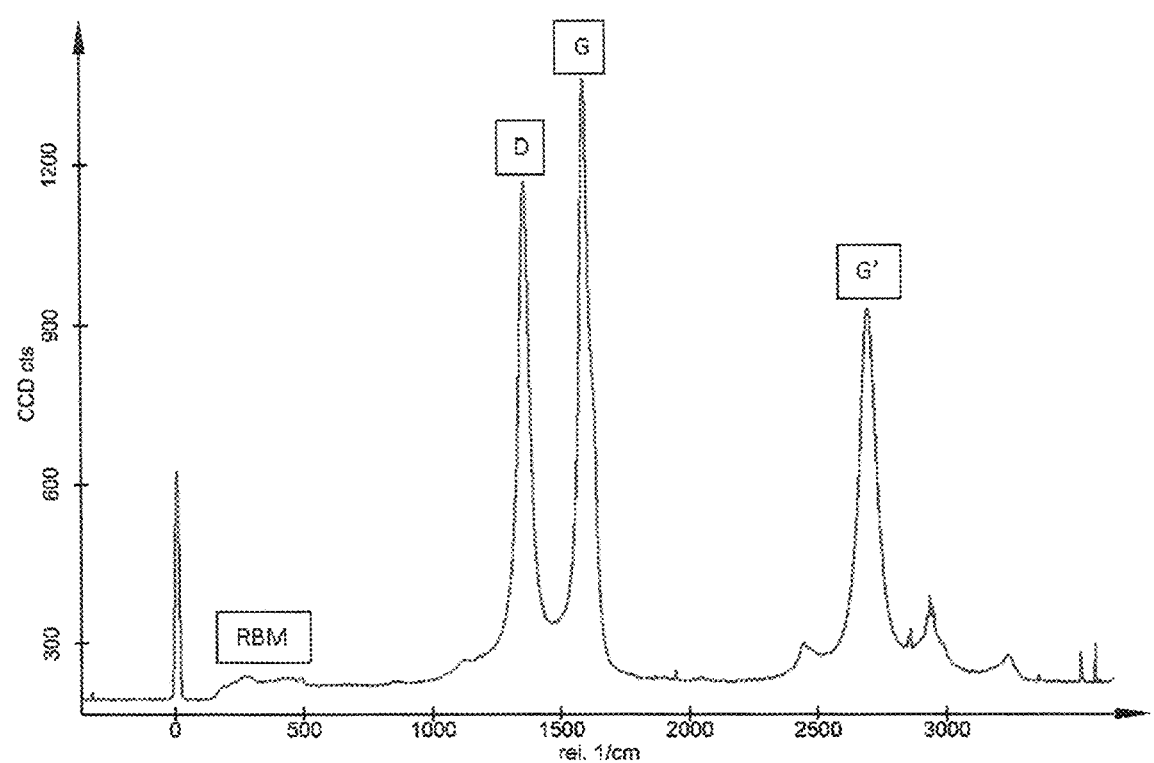
FIG. 15 is a broad Raman spectrum for a typical CNT nanocarbon mixture produced using a heated reactor and catalytic decomposition of a hydrocarbon feed gas.
Figure 16:
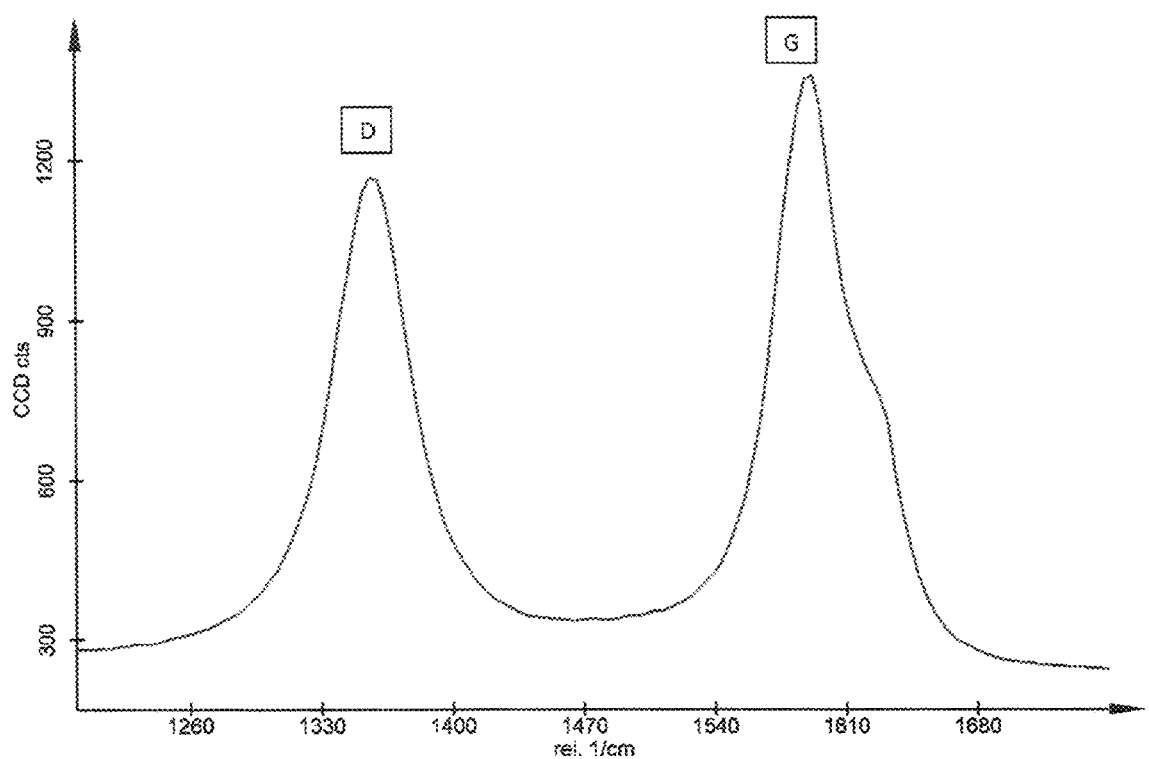
FIG. 16 is a close up view of the D and G mode peaks of the Raman spectrum of FIG. 15.

Referring to FIG. 15, a broad Raman spectrum is shown for a typical nanocarbon mixture produced using a heated reactor and catalytic decomposition of a hydrocarbon feed gas. FIG. 16 is a close up view of the D and G mode peaks of the Raman spectrum. In this application, Raman spectroscopy was used to characterize the nanocarbon particles in the nanocarbon mixture. In particular, Raman spectroscopy was used to verify that the nanocarbon mixture contains multiwall nanotubes, primarily comprised of carbon arranged in a graphitic crystal structure, along with other "amorphous" carbon.

In FIGS. 15 and 16, the second major peak at ~1590 l/cm ("G mode") shows that a slight majority of the carbon structure is graphitic (CNTs). The first major peak at ~1360 l/cm ("D mode") indicates that tube defects and amorphous carbon forms are also present in the nanocarbon mixture. The area of the D peak relative to the G peak shows that defects and amorphous carbon atomic structures are quite common in this carbon multiwall nanotube sample, as verified by the TEM images above. A small "peak" from ~200 l/cm to ~500 l/cm (radial breathing mode, or RBM) is indicative of the wide range of tube diameters in the sample. The third major peak at ~2720 l/cm (G' mode) is the second harmonic of the D mode peak, which is not very useful for characterization of this product, so it is omitted for the close-up of the D and G peaks shown in FIG. 16. The Raman spectrum shown in FIGS. 15 and 16 indicates that the nanocarbon mixture contains about 50-60% CNTs. The remainder of the nanocarbon particles, which are less than about 50% of the total number of nanocarbon particles, are not in pure graphitic form. By way of example, the nanocarbon particles can comprise from 43% to 58% by mass of CNTs. As another example, the nanocarbon particles comprise from 30% to 50% by mass of CNTs.

CNF Nanocarbon Mixture

Figure 17:
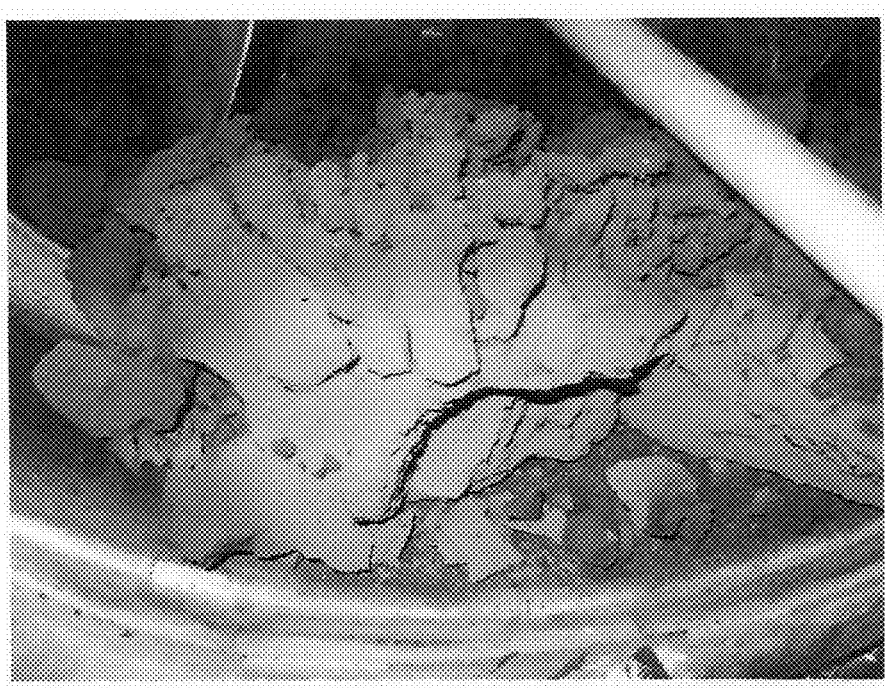
FIG. 17 is a photo of a raw, bulk CNF nanocarbon mixture containing carbon nanofibers (CNFs) prior to crushing or grinding.

Referring to FIG. 17, a raw, bulk nanocarbon mixture containing carbon nanofibers (CNFs) is shown. The CNF nanocarbon mixture was produced using a heated reactor and catalytic decomposition of a hydrocarbon feed gas and contains a selected percentage range of CNFs. The nanocarbon mixture comprises CNFs containing defects as well as other amorphous forms of nanocarbon.

The CNF nanocarbon mixture has the texture of powder but includes large clumps and agglomerates of carbon material. As with the nanocarbon mixture shown in FIG. 2, the CNF nanocarbon mixture can also be crushed or ground into a powder (not shown). While also generally cylindrical in shape, CNFs differ from CNTs because their structure is comprised of stacked disks, cones or cups of generally graphitic sheets of carbon atoms. CNFs typically have a larger average diameter and shorter average length than CNTs, as well.

Figure 18:
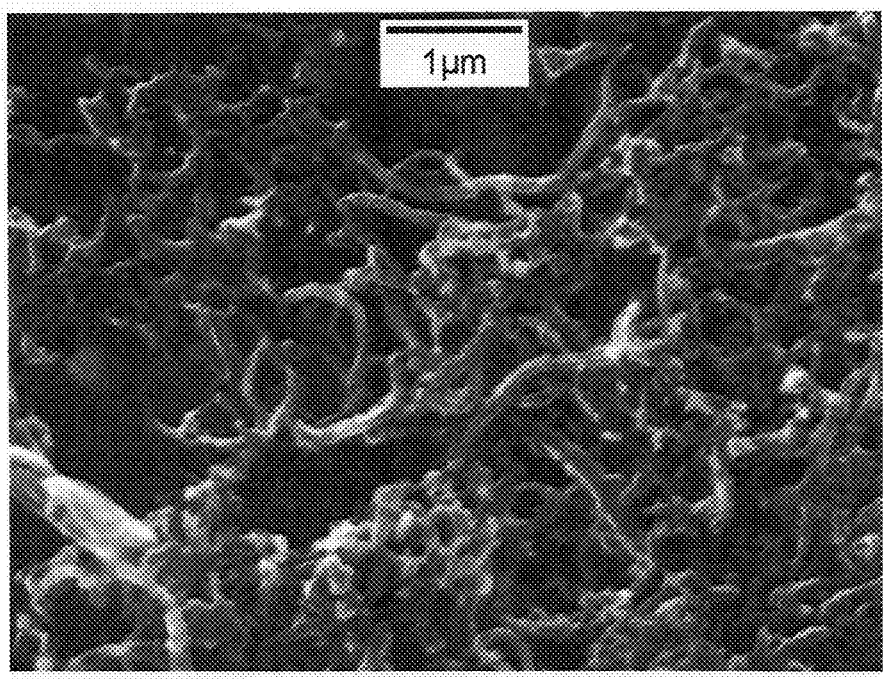
FIG. 18 is a SEM photo, with a 1 μm scale shown in the upper center, showing a bundle of CNFs in the CNF nanocarbon mixture of FIG. 17.
Figure 19:
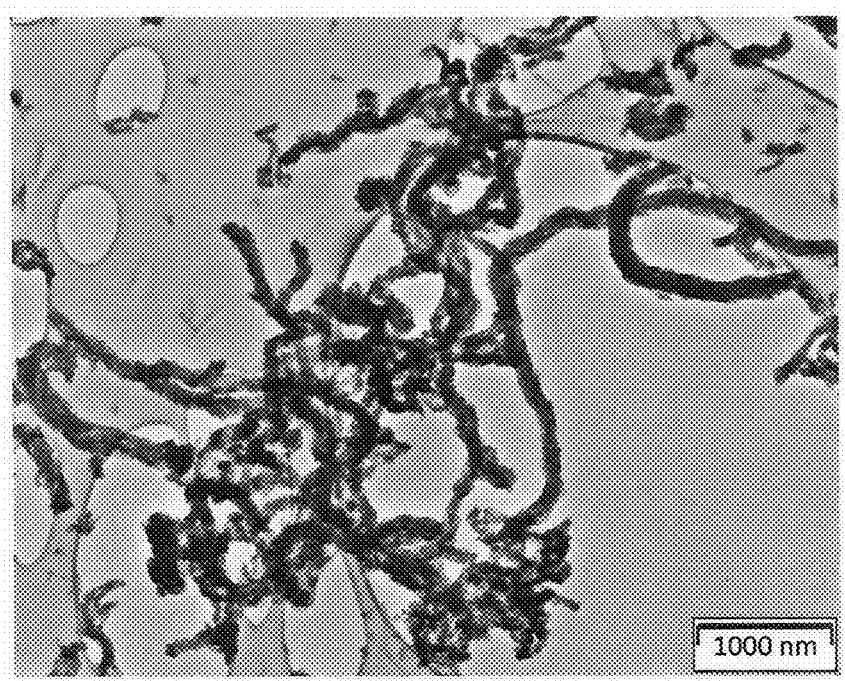
FIG. 19 is a TEM photo, with a 1000 nm scale shown in the lower right hand corner, showing no hollow structure in the CNFs of FIG. 18.
Figure 20:
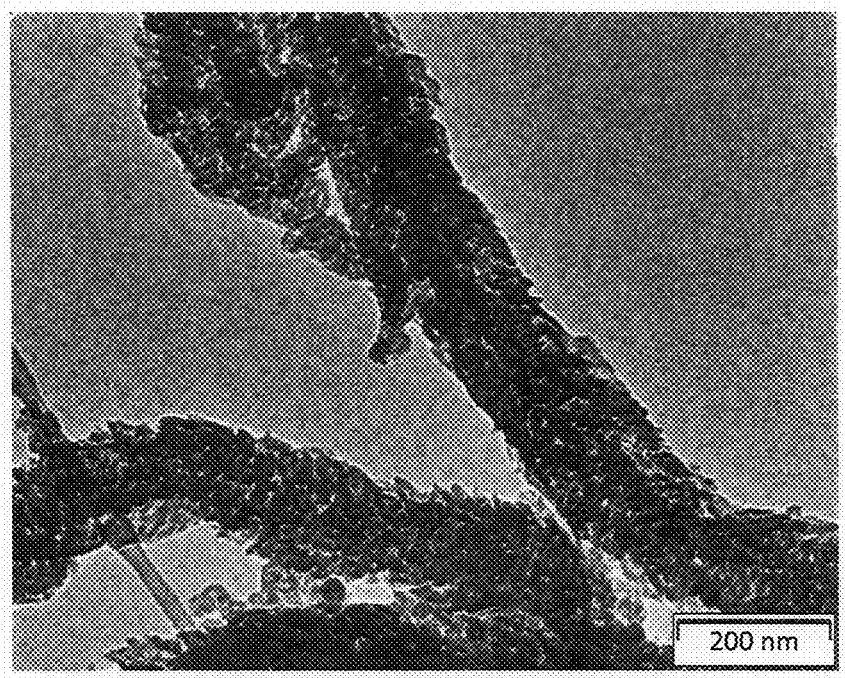
FIG. 20, with a 200 nm scale shown in the lower right hand corner, is a TEM photo showing the "stacked cups" internal structure of the CNFs of FIG. 18 obtained with a higher magnification.
Figure 21:
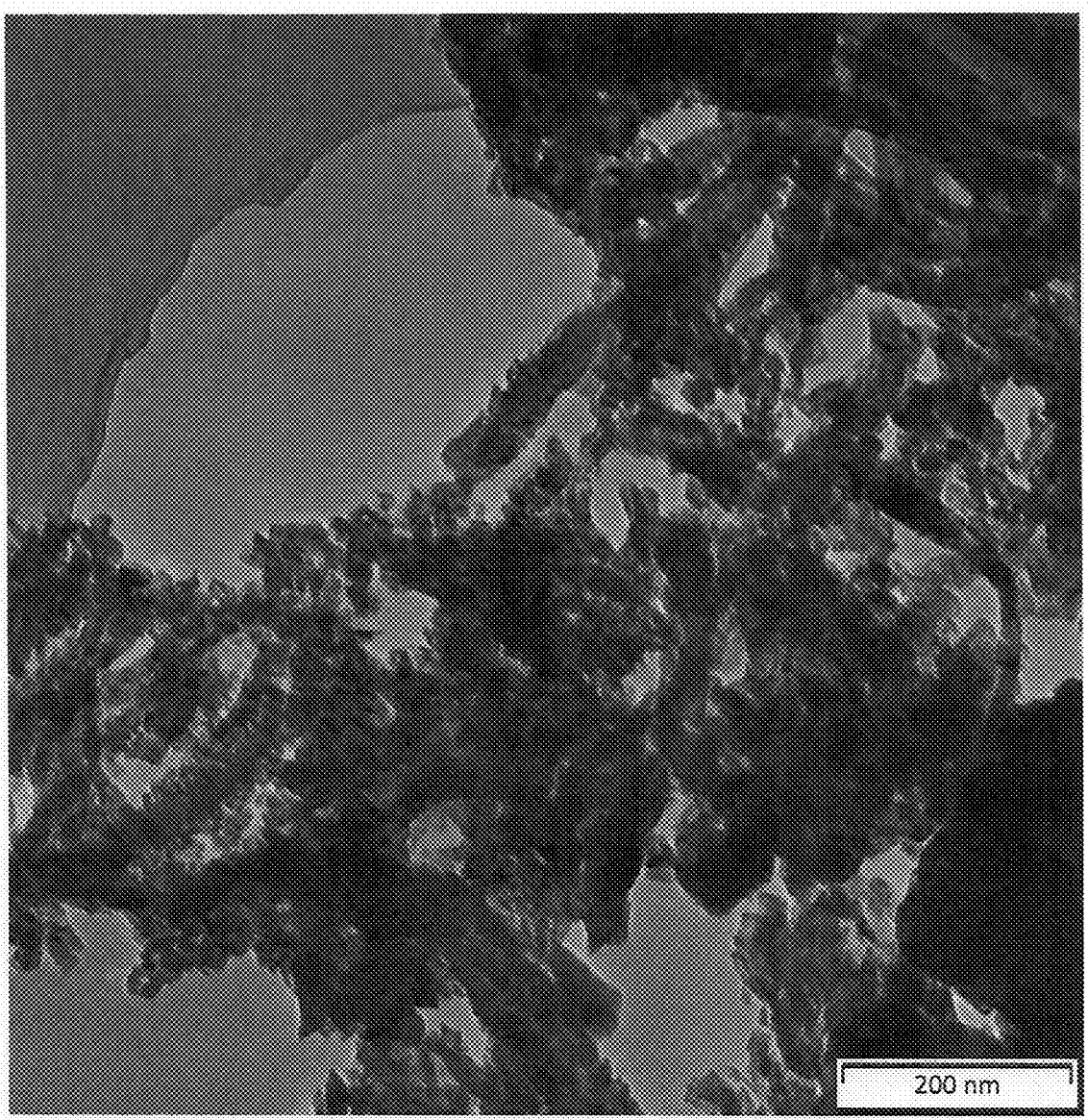
FIG. 21 is a TEM photo, with a 200 nm scale shown in the lower right hand corner, showing CNF/amorphous nanocarbon clumps in the CNF nanocarbon mixture of FIG. 17.
Figure 22:
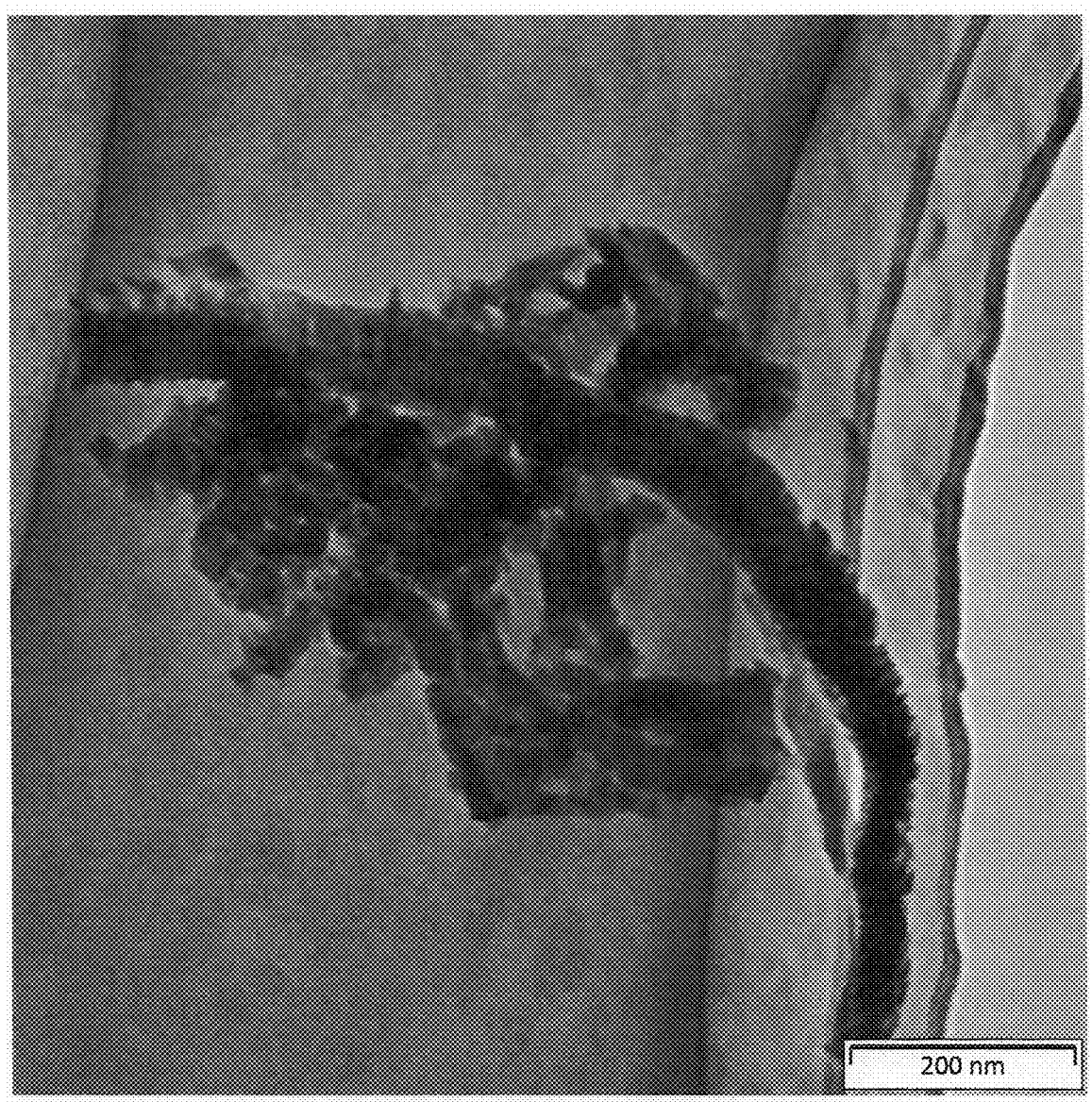
FIG. 22 is a TEM photo showing CNF nanocarbon fibers, which commonly have non-uniform diameters and a wide range of lengths, in the CNF nanocarbon mixture of FIG. 17.

Referring to FIG. 18, a bundle of CNFs in the CNF nanocarbon mixture is shown. As shown in FIG. 19, the CNFs do not have a hollow interior structure. As shown in FIG. 20, the CNFs have a "stacked cups" internal structure. In FIG. 21, CNF/amorphous nanocarbon clumps are shown in the nanocarbon mixture. FIG. 22 shows the CNF/nanocarbon fibers with non-uniform diameters and lengths.

Figure 23:
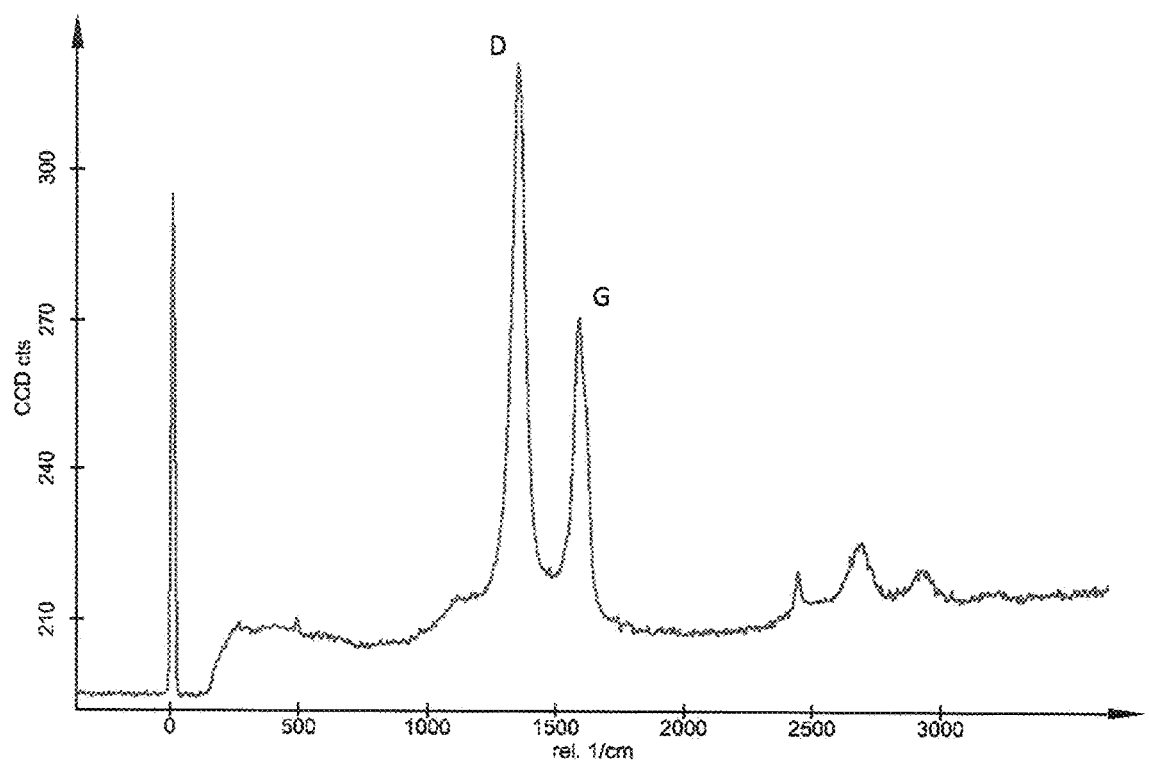
FIG. 23 is a broad Raman spectrum for a typical CNF nanocarbon mixture produced using a heated reactor and catalytic decomposition of a hydrocarbon feed gas.

Referring to FIG. 23, Raman spectroscopy can be used to verify that the CNF nanocarbon mixture contains carbon nanofibers (CNFs), which are primarily comprised of the stacked plates, cones, or cups of carbon arranged in layers of a graphite (hexagonal) crystal structure, along with other "amorphous" carbon. FIG. 23 is a typical Raman spectrum for the CNF nanocarbon mixture. The second major peak at the ~1590 l/cm ("G mode") shows that much of the carbon structure is graphitic (CNFs). The first major peak at ~1360 l/cm ("D mode") indicates that defects in the stacked layers of the fibers and amorphous carbon forms are the majority of the CNF/nanocarbon product composition. The Raman spectrum shown in FIG. 23 indicates that the CNF nanocarbon mixture contains about 30-50% CNFs and more than about 50% is not in pure graphitic form. By way of example, the nanocarbon particles can comprise from 43% to 58% by mass of CNFs. As another example, the nanocarbon particles comprise from 30% to 50% by mass of CNFs.

System and Method

Figure 24:
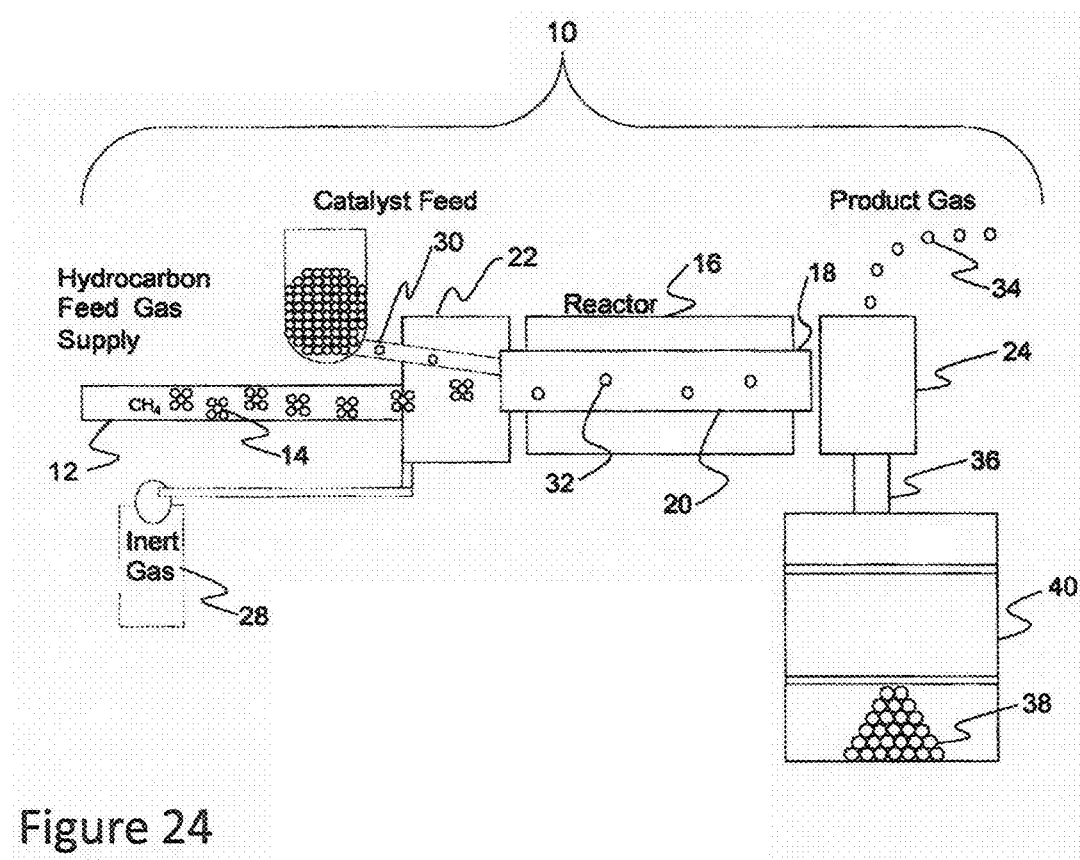
FIG. 24 is a schematic of a system for producing the nanocarbon mixtures of FIGS. 1-24.

Referring to FIG. 24, a system 10 and method for making the CNT nanocarbon mixture or the CNF nanocarbon mixture are illustrated schematically. In the illustrative embodiment, the system 10 is configured to perform a batch process, but can alternately be configured to continuously produce the CNF nanocarbon mixture. The system 10 includes a hydrocarbon feed gas supply 12 configured to supply a hydrocarbon feed gas 14. The hydrocarbon feed gas 14 can comprise pure methane or natural gas obtained from a "fossil fuel" deposit. Natural gas is typically about 90% methane, along with small amounts of ethane, propane, higher hydrocarbons, and "inerts" like carbon dioxide or nitrogen. Alternately, the hydrocarbon feed gas 14 can comprise a higher order hydrocarbon such as ethylene or propane. In addition, the hydrocarbon feed gas supply 12 can comprise a tank (or a pipeline) configured to supply the hydrocarbon feed gas 14 at a selected temperature, pressure, and flow rate. By way of example the temperature of the hydrocarbon feed gas 14 can be from 600 to 900° C., the pressure can be from 0.0123 to 0.0615 atmospheres and the flow rate can be from 0.05 to 3.0 liter/minute per gram of catalyst.

The system 10 also includes a reactor 16 comprising a hollow reactor cylinder having a sealable inlet 22, a reaction chamber 20 in fluid communication with the inlet 22, and a sealable outlet 24 in fluid communication with the reaction chamber 20 adapted to discharge the nanocarbon mixture 38, which can comprise a nanocarbon mixture having the composition shown in FIG. 15, or a CNF nanocarbon mixture having the composition shown in FIG. 23, depending on the process parameters. In addition to the nanocarbon mixture 38, the method produces a product gas 34 comprised of hydrogen and unreacted hydrocarbon feed gas. For performing the method, the reaction chamber 20 can be heated by thermal combustion or electricity to a temperature of from 600 to 900° C. In addition, the reaction chamber 20 can be in fluid communication with an inert gas supply 28.

The system 10 can also includes a catalyst transport system 18 adapted to move a metal catalyst 30 through the reaction chamber 20 in contact with the hydrocarbon feed gas 14 to produce the nanocarbon mixture 38 and the product gas 28. The catalyst transport system 18 can be in the form of a chain conveyor system, a rotating auger system, a high velocity pneumatic system or a plunger system. In any case, the catalyst transport system 18 is adapted to move a selected amount of the metal catalyst 30 through the reaction chamber 20 at a rate dependent on the flow rate of the hydrocarbon feed gas 14. For example, with the flow rate of the hydrocarbon feed gas 14 between 0.05 and 3.0 liters/minute, the selected amount of the metal catalyst 30 can be about one gram/minute. Alternately, rather than a catalyst transport system 18, the metal catalyst 30 can be simply placed in the reaction chamber 20.

The metal catalyst 30 can be provided in the form of particles. A preferred metal for the metal catalyst 30 comprises Ni, or an alloy containing Ni. For example, the metal can comprise NiAl, or Ni alloyed with Cu, Pd, Fe, Co, or an oxide such as MgO, ZnO, $Mo_2O_3$ or $SiO_2$. However, rather than Ni or an alloy thereof, the metal catalyst 30 can comprise another metal, such as a metal selected from group VIII of the periodic table including Fe, Co, Ru, Pd and Pt.

The system 10 also includes a carbon separator 40 adapted to separate the nanocarbon mixture 38 from the product gas 34 via gravity or cyclonic separation. The system 10 can also include a high energy mixer (not shown) configured to mix the nanocarbon mixture 38 with water and a superplasticizer surfactant to form the liquid admixture. The high energy mixer can also be used to mix a nano-silica based compound for long-term stability of the suspended nanocarbon particles in the liquid admixture. Suitable high energy mixers can include one or more of the following: high-shear rotating mixers, such as pumps and turbines, rotor/stator mixers, and blade dispersers; mechanical grinding and impact-type mixers, such as attritors, ball mills, and hammer mills; and high pressure fluidic mixing devices, such as nozzles, orifices, and high-velocity impact devices, such as homogenizer pumps, valves and similar equipment.

By utilizing different compositions for the metal catalyst 32, and by controlling process parameters, the process can be used to produce the nanocarbon mixture 38 with the desired types of particles and mass percentages in the nanocarbon mixture 38. During continuous production of the nanocarbon mixture 38 the amount of hydrogen in a methane/natural gas hydrocarbon feed stock gas 14 remains fairly constant in the range from 10-80% by volume, depending on the material being produced. When using higher hydrocarbon feedstock gas 14 such as ethylene or propane, more carbon production can be expected with less hydrogen in the product gas 34. For example, for obtaining a nanocarbon mixture, the method can be controlled to provide approximately from about 20:1 to 40:1 carbon to catalyst mass ratio. For obtaining a CNF nanocarbon mixture, the method can be controlled to provide from about 200:1 to 500:1 carbon to catalyst mass ratio.

During the wetting and mixing step a predetermined quantity of the nanocarbon mixture in carbon powder form is mixed with a predetermined quantity of water/surfactant mixture with intense, high energy, large scale mixing equipment. Exemplary quantities of the nanocarbon mixture, superplasticizer surfactant, nano-silica based compound and water in the admixture include: nanocarbon mixture 0.4% to 1.9% mass percentage of total mass of admixture, superplasticizer surfactant 2% to 9% mass percentage of total mass of admixture, nano-silica based compound 5% to 21% mass percentage of total mass of admixture, and water 57% to 93% mass percentage of total mass of admixture. During the wetting and mixing step, an organic compound including a functional group that contains a basic nitrogen atom with a lone pair can also be mixed into the admixture to increase early and/or late strength development in the concrete. A representative dosage can be from 0.5 to 20% by mass of the admixture.

The system and method can also be configured to produce, co-produce or mix in other forms of nanocarbon (e.g., graphene particles, graphite particles, carbon black, and "amorphous" paracrystalline and polycrystalline carbon particles, nanodiamonds, and single-layer and multi-layer fullerene particles) in a desired ratio (e.g., 50/50 mix by mass). In addition, the system and method utilize high-intensity mixing to de-agglomerate the nanocarbon particles in the water based admixture. Further, the system and method utilize a surfactant, known in the concrete industry as a water reducer or superplasticizer, to keep he nanocarbon particles dispersed in the liquid admixture. Still further, the system and method can utilize a compound with nano-silica, such as silica fume, in the admixture to keep the nanocarbon particles in suspension for relatively long-term storage and distribution of the admixture.

Method for Making Concrete

A method for making concrete includes the steps of providing the admixture and then mixing the admixture with water, cement (with or without supplementary cementitious materials), and mineral aggregates in selected quantities.

TABLE 1 identifies the ingredients of a sample concrete made using the admixture. TABLE 2 illustrates ASTM C494 test results for sample concretes made using the admixture, with the admixture identified under the trademark EDENCRETE. By varying the dosage of the admixture, and the amount of cementitious material, a desired ratio of the different nanocarbon particles to cementitious material in the cured concrete can be obtained. Preferably, these quantities are controlled to provide a range of CNT/total cementitious material for a CNT admixture of from 0.0002% to 0.0199% by mass, and/or CNF/total cementitious material for a CNF admixture, of from 0.0002% to 5% by mass.

TABLE 1

Based upon a concrete unit weight of 4100 lbs./yd.$^3$

| Material | Notes | Min. % wt. per yd$^3$ | Max. % wt. per yd$^3$ |
| --- | --- | --- | --- |
| Water | corresponding to water/cementitious = 0.25-0.60 | 1.22 | 16.10 |
| Cement | | 4.88 | 21.95 |
| Sand | | 24.39 | 31.71 |
| Rock | | 36.59 | 43.90 |
| Silica Fume | 3-5%, replacement by weight of cement | 0.15 | 0.66 |
| Fly Ash | 10-30%, replacement by weight of cement | 0.49 | 6.59 |
| Slag | 10-70%, replacement by weight of cement | 0.49 | 15.37 |

| Admixtures | | Min. % wt. per Yd$^3$ | Max. % wt. per Yd$^3$ |
| --- | --- | --- | --- |
| Type A Low Range Water Reducer | 2-5 oz./cwt | 0.0064 | 0.088 |
| Type A Mid-Range Water Reducer | 4-8 oz/cwt | 0.012 | 0.14 |
| Type B Retarders Traditional Sugar-based | 2-4 oz/cwt | 0.0064 | 0.07 |
| Type B Retarders Hydration | 2-6 oz/cwt | 0.0064 | 0.11 |

TABLE 1-continued

Based upon a concrete unit weight of 4100 lbs./yd.³

| Stabilizers | | | |
|---|---|---|---|
| Type C Accelerators Calcium | 1%; 7-10 oz/cwt | 0.022 | 0.18 |
| Type C Accelerators Non-Calcium | 1%; 12-16 oz/cwt | 0.038 | 0.28 |
| Type D Water reducing and retarding | N/A | — | — |
| Type E | N/A | — | — |
| Type F HRWRA | 7-15 oz/cwt | 0.022 | 0.27 |
| Type G | obsolete | — | — |
| Type S SRA & CNI | 0.25-3 gpy | 0.003 | 0.04 |

TABLE 2

EdenCrete ™
ASTM C494 Results

% Increase Over Reference; Dosage = 3.5 gpy
Age (Days)

| TEST | 1 | 3 | 7 | 28 | 56 | 90 | 180 | 365 |
|---|---|---|---|---|---|---|---|---|
| Compressive Strength (ASTMC39) | 25% | 35% | 39% | 41% | 41% | 39% | 38% | 37% |
| Flexural Strength (ASTM C78) | | 25% | 19% | 32% | | | | |
| Split-tensile Strength (ASTM C496) | | | | 29% | 22% | | | |
| Abrasion Resistance (ASTM C779 Proc C) | | | | | | 62% | 61% | |
| Length of Change (ASTM C157; Shrinkage) | | | | 39% reduction | | | | |
| Time of Set (ASTM C403) | Reduced: Initial Set 3 min, Final Set 4 min | | | | | | | |
| Freeze/Thaw Resistance (ASTM C666) | Reference = 88.0, EdenCrete = 96.4; 9.55% enhancement | | | | | | | |

Program Complete
EdenCrete ™ successfully conforms to the ASTM C494 Specification for Type S chemical admixtures used in concrete.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. An admixture in liquid form for making concrete comprising:
   a suspension of uniformly dispersed nanocarbon particles in a water/surfactant mixture, including at least two different types of particles selected from the group consisting of carbon nanotube particles, carbon nanofiber particles, graphene particles, graphite particles, carbon black, paracrystalline carbon particles, polycrystalline carbon particles, nanodiamonds, single-layer fullerene particles, and multi-layer fullerene particles, with the carbon nanoparticles having a predetermined percentage range of from 0.4% to 1.9% of a total mass of the admixture;
   a nano-silica-based suspension stabilizer configured to improve a long term stability of the suspension of nanocarbon particles in the liquid admixture; and
   a surfactant configured to facilitate dispersion of the nanocarbon particles having a percentage range by the total mass of the admixture of from 2% to 9%.

2. The admixture of claim 1 further comprising an organic compound including a functional group that contains a basic nitrogen atom with a lone pair to increase early and/or late strength development in the concrete.

3. The admixture of claim 1 wherein the nanocarbon particles comprise 43% to 58% of carbon nanotube particles based on a total mass of the nanocarbon particles.

4. The admixture of claim 1 wherein the nanocarbon particles comprise 30% to 50% of carbon nanofiber particles based on a total mass of the nanocarbon particles.

5. The admixture of claim 1 wherein a nanocarbon/total cementitious material ratio in the concrete is from 0.0002% to 0.034% by mass.

6. The admixture of claim 1 wherein a nanocarbon/total cementitious material ratio in the concrete is from 0.001% to 0.1% by mass.

7. An admixture in liquid form for making concrete comprising:
   a suspension of uniformly dispersed nanocarbon particles in a water/surfactant mixture, including at least two different types of particles selected from the group consisting of carbon nanotube particles, carbon nanofiber particles, graphene particles, graphite particles, carbon black, paracrystalline carbon particles, polycrystalline carbon particles, nanodiamonds, single-layer fullerene particles, and multi-layer fullerene particles, with the carbon nanoparticles having a predetermined percentage range of from 0.4% to 1.9% of a total mass of the admixture, the nanocarbon particles comprising 43% to 58% of carbon nanotube particles based on a total mass of the nanocarbon particles;
   a nano-silica-based suspension stabilizer configured to improve a long term stability of the suspension of nanocarbon particles in the liquid admixture having a percentage range by the total mass of the admixture of from 5% to 21%; and
   a surfactant configured to facilitate dispersion of the nanocarbon particles having a percentage range by the total mass of the admixture of from 2% to 9%.

8. The admixture of claim 7 further comprising an organic compound including a functional group that contains a basic nitrogen atom with a lone pair to increase early and/or late strength development in the concrete having a percentage range by the total mass of the admixture of 0.5 to 20%.

9. The admixture of claim 7 wherein a CNT/total cementitious material ratio in the concrete is from 0.0002% to 0.0199% by mass.

10. An admixture in liquid form for making concrete comprising:
   a suspension of uniformly dispersed nanocarbon particles in a water/surfactant mixture, including at least two different types of particles selected from the group consisting of carbon nanotube particles, carbon nanofiber particles, graphene particles, graphite particles, carbon black, paracrystalline carbon particles, polycrystalline carbon particles, nanodiamonds, single-layer fullerene particles, and multi-layer fullerene particles, with the carbon nanoparticles having a predetermined percentage range of from 0.4% to 1.9% of a total mass of the admixture, the nanocarbon particles comprising 30% to 50% of carbon nanofiber particles based on a total mass of the nanocarbon particles;
   a nano-silica-based suspension stabilizer configured to improve a long term stability of the suspension of nanocarbon particles in the liquid admixture having a percentage range by the total mass of the admixture of from 5% to 21%; and
   a surfactant configured to facilitate dispersion of the nanocarbon particles having a percentage range by the total mass of the admixture of from 2% to 9%.

11. The admixture of claim 10 further comprising an organic compound including a functional group that contains a basic nitrogen atom with a lone pair to increase early and/or late strength development in the concrete having a percentage range by the total mass of the admixture of 0.5 to 20%.

12. The admixture of claim 10 wherein a CNT/total cementitious material ratio in the concrete is from 0.0002% to 0.0199% by mass.

* * * * *